Feb. 8, 1944.  C. A. FOURNESS ET AL  2,341,370
METHOD OF MAKING CELLULOSIC PRODUCTS
Original Filed June 19, 1940   2 Sheets-Sheet 1
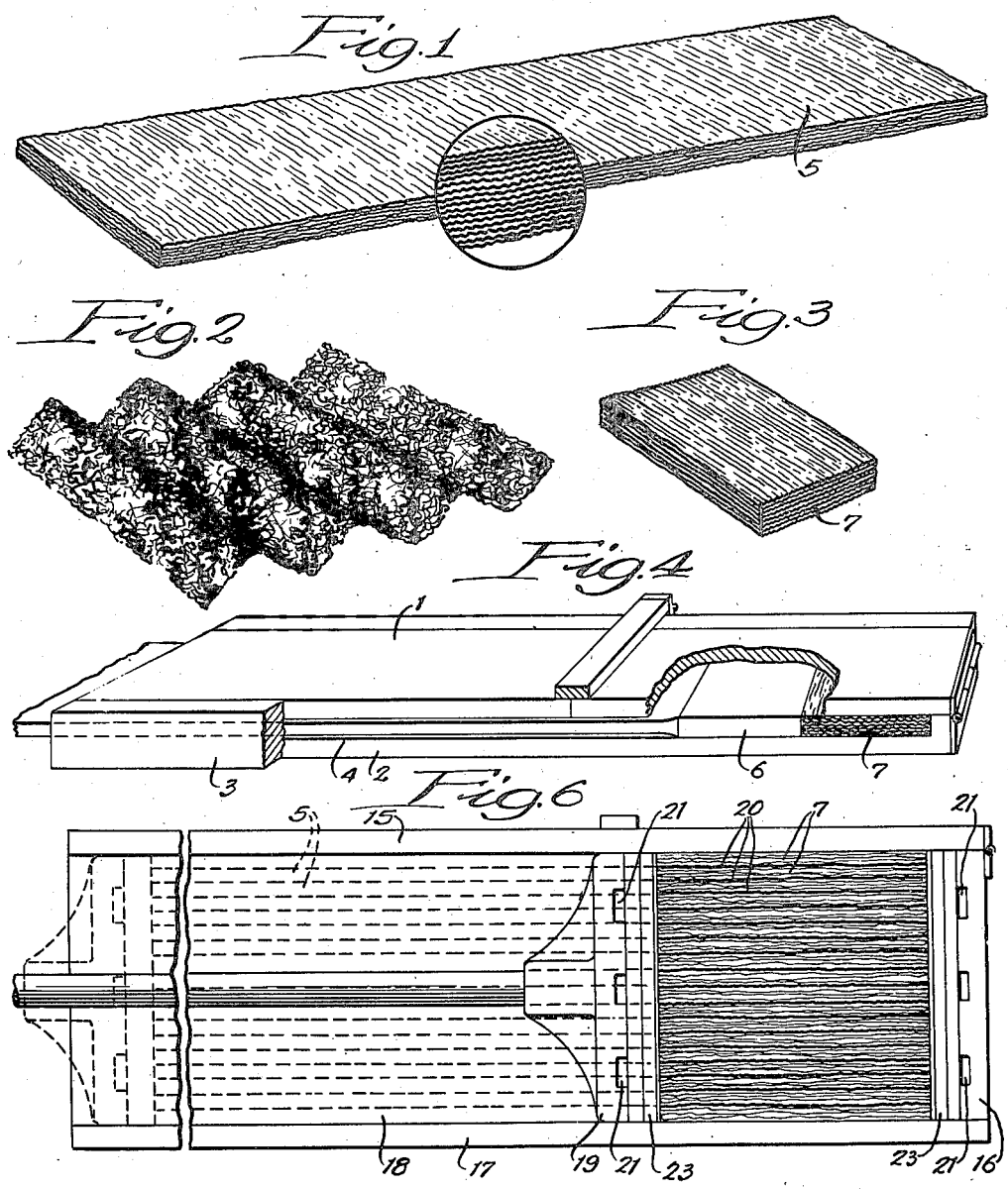
Inventors:
Charles A. Fourness
and John B. Catlin,
By Soans, Pond & Anderson
Attorneys.

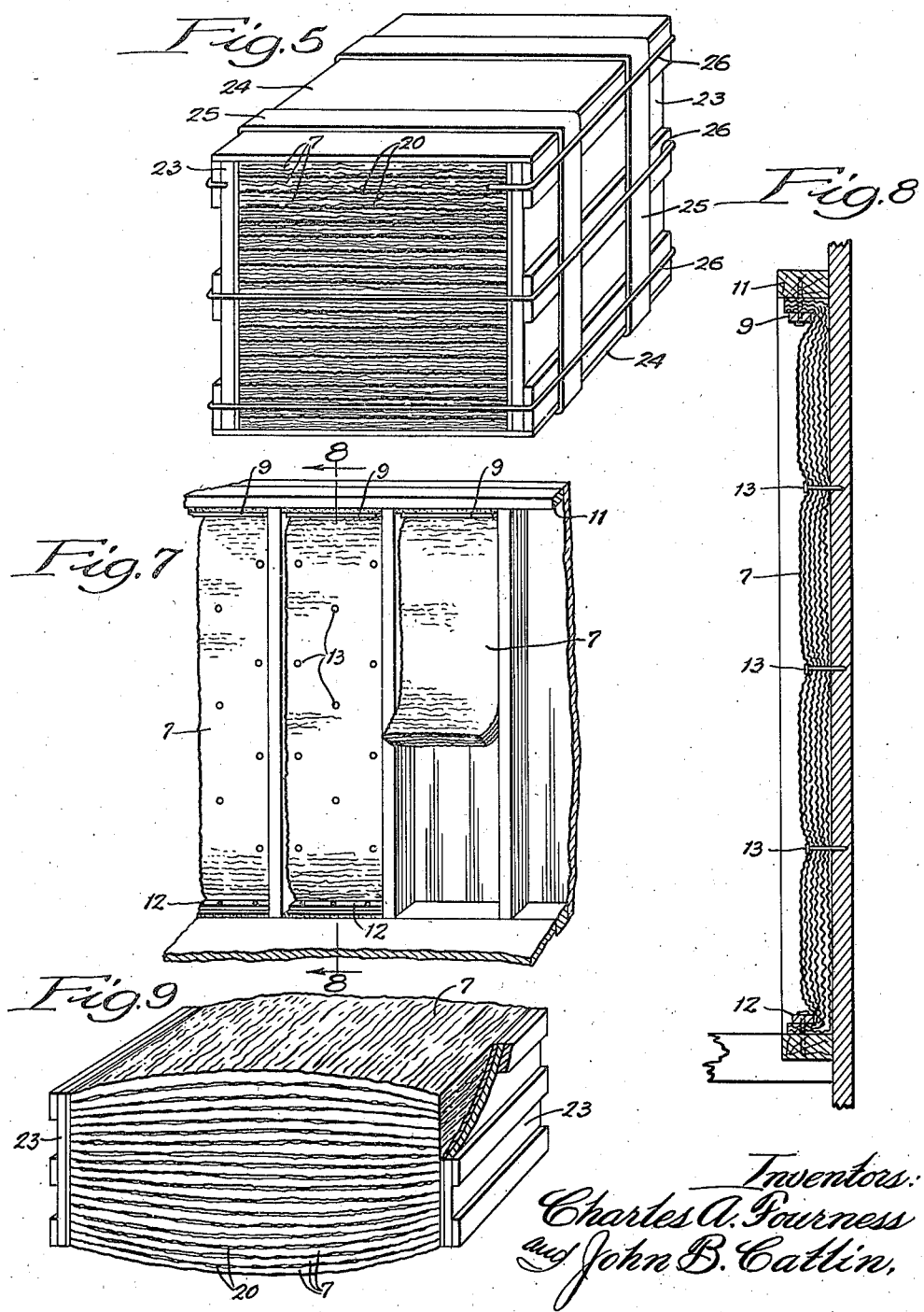

Patented Feb. 8, 1944

2,341,370

UNITED STATES PATENT OFFICE 2,341,370

METHOD OF MAKING CELLULOSIC PRODUCTS

Charles A. Fourness and John B. Catlin, Appleton, Wis., assignors to Paper Patents Company, Neenah, Wis., a corporation of Wisconsin Original application June 19, 1940, Serial No. 341,262. Divided and this application August 10, 1942, Serial No. 454,212

11 Claims. (Cl. 100—14)

The present invention relates to multi-ply, creped, cellulosic products such as are disclosed in United States Letters Patent No. 2,102,233 to Frank A. Biederman and No. 2,170,655 to Charles A. Fourness, both of which patents are assigned to the assignee of this invention. This application is a division of our application Ser. No. 341,262 filed June 19, 1940, which is a continuation in part of our prior application Ser. No. 114,590 which was filed December 7, 1936, and both of which prior applications are assigned to the assignee of this application.

Products of the type disclosed in the above mentioned Biederman and Fourness patents comprise a pad or bat of low unit density which is formed by superposing a plurality of generally flat layers of thin, creped, cellulosic tissue. For certain uses, as disclosed and claimed in the Fourness patent the individual sheets contain asphalt or other thermo-plastic material in varying amounts. Certain of the thermo-plastic bearing products are water resistant to a very high degree. If desired, any of the products may be also fireproofed.

Products of this type are widely used as packing materials, liquid absorbing or filtering materials, and as insulating materials, for both heat and sound insulation, the asphalt bearing product being particularly satisfactory for insulation uses. However, because of the extremely large bulk of these products with respect to their weight, the boxing, shipping, storing, and handling costs of the products have been unreasonably and excessively high.

Heretofore, all attempts to increase the unit density of these products for the purposes of shipment, storage, etc., have resulted in serious impairment of the properties of the products. Attempts to bale these products, for example, by any of the known baling methods accomplish the desired reduction in bulk and increase in unit density, but the reduction of bulk for practical purposes becomes permanent, and the product cannot be restored by any commercially practical procedures to its useful low density, high bulk condition after it has once been compressed and baled. In fact, the deleterious effects of compressing the products even slightly are so serious that heretofore it has been necessary to ship and handle the product in rigid cartons or containers.

We have discovered, however, that contrary to the accepted teachings and practices of the art, the subject low density, high bulk products described in the above mentioned Biederman and Fourness patents can be converted into intermediate products of relatively low bulk and of relatively high density, which intermediate products can be restored at any time to a low density, high bulk condition so as to render it suitable for use.

More particularly, we have discovered that any of the multi-ply, high bulk, low density bat or pad products described in the above mentioned Biederman and Fourness patents can be converted into a relatively dense, low bulk product by longitudinally compressing the original bat or pad in a direction substantially perpendicular to the creping therein, and that the resultant compressed product, contrary to the products produced by ordinary methods of compression, can be readily restored to its original low density, high bulk state at any time merely by longitudinally extending the compressed pad or bat, as by stretching.

This intermediate compressed product when manufactured in accordance with the present invention is of sufficiently low bulk and of sufficiently high unit density to permit economical and convenient boxing, shipping, handling, and storing thereof, while at the same time the intermediate product can conveniently and easily be restored to its original state of great bulk and low unit density when it is desired to use the product.

Moreover, this intermediate compressed product is found to possess certain very remarkable and quite unexpected properties not possessed by the original product. The bulk of the restored product, for example, is even greater than the bulk of the original product, and when the product is used as an insulating material this increase correspondingly improves the insulating efficiency of the product as compared with the efficiency of the original product. Further, the length of the restored product can be readily controlled within rather wide limits. This means that a single standardized article may be used for insulating spaces of relatively widely varying physical dimensions and makes possible a new and highly desirable method of insulating buildings, wall spaces, and the like. If the longitudinal compression and restoration of the product is repeated a number of times, it has been found that the bulk of the product may be increased as much as a hundred per cent, with corresponding increased improvement in the product as an insulating material since the insulating efficiency of products of this type is substantially a function of the bulk of the product without regard to its density.

Other advantages result from the use of the present invention in that the manufacture of the intermediate high density product may be conveniently carried out as a continuous operation by the use of suitable equipment (see application Ser. No. 247,561, Richard K. Neller, filed December 24, 1938 which has issued as Patent No. 2,303,087, dated November 24, 1942) or, if desired, a bale of these intermediate products may be formed simultaneously from a plurality of low density bats. These characteristics and properties of the invention serve to greatly decrease the manufacturing costs incident to the carrying out of the invention and are to a considerable extent responsible for its great commercial success. The baling methods made possible by the invention also permit most convenient restoration of the article to its original state, as will be described in some detail in subsequent paragraphs. The invention also finds application for the purpose of increasing the bulk of the low density products of the subject type.

These and other advantages of the invention and the preferred methods of accomplishing the same will be made more apparent by reference to the following description of certain preferred embodiments thereof and in the accompanying drawings, wherein—

Figure 1 is a perspective view of a multi-ply pad or bat product of the type to which the present invention particularly pertains. A portion of the bat has been magnified to better illustrate the features thereof;

Figure 2 is an enlarged perspective view of a portion of one of the sheets making up the pad or bat product shown in Figure 1;

Figure 3 is a perspective view, similar to Figure 1, showing a multi-ply, relatively dense, cellulosic product—the intermediate product mentioned in the foregoing—manufactured in accordance with the present invention, this figure is drawn to the same scale as Figure 1;

Figure 4 is a perspective view, somewhat diagrammatic in form, illustrating the features of an apparatus which may be used for producing the so-called intermediate product illustrated in Figure 3;

Figure 5 is a perspective view showing a bale of the individual units illustrated in Figure 3;

Figure 6 is a sectional view, somewhat diagrammatic in form, illustrating a press which may be used for forming the bale illustrated in Figure 5;

Figure 7 is a fragmentary perspective view illustrating one manner in which the product of the present invention may be utilized;

Figure 8 is an enlarged sectional view on the general line 8—8 of Figure 7; and

Figure 9 is a perspective view of a modified form of bale generally similar to that shown in Figure 5, this bale has been partially expanded.

As indicated in the foregoing, the present invention is primarily concerned with, although not necessarily limited to, products of certain specific types, namely the multi-ply, low density, pad or bat products disclosed and claimed in the above mentioned Biederman and Fourness patents. These products, as pointed out in the Biederman and Fourness patents, are manufactured by superposing a plurality of sheets of thin, creped, cellulosic tissue. The tissue sheets may be plain (i. e., consist of from about 94 to 96% by weight of commercial cellulose fiber, exclusive of clay or like inert filler material) or they may contain substantial amounts of asphalt (10 to 50% by weight) or equivalent thermoplastic material, as described particularly in the Fourness Patent 2,170,655.

As manufactured at the present time the pads or bats comprise about three to possibly 150 or more sheets or plies of the tissue, the thickness of the bats ranging from about one-eighth to two or three inches or more. The small magnified section of Fig. 1 illustrates the general arrangement of the sheets, and a portion of one of the individual sheets used in making the bats is illustrated in Fig. 2. The product, as manufactured, is very bulky, porous, and of low density. In addition to its desirable properties as a packing material, liquid absorbing material, etc., it possesses excellent thermal and sound insulating properties.

If the sheets contain asphalt or other thermoplastic material, it is desirable that this material shall be in the form of small discrete particles of widely varying dimensions which are individually attached to the fibers or groups of fibers making up the sheet. Also it is practically essential that the thermoplastic material should be of a type which is relatively brittle at room temperature and which has a melting point within the range of about 140° F. to 200° F. Asphalt or equivalent thermoplastic material of this type and in this form has the particular property of effecting marked reduction in the stable density of the product as pointed out in the Fourness patent.

Regardless of whether plain or asphalt containing sheets are used, the sheets have a basis weight, or more properly a dryer basis weight (i. e. weight of flat uncreped sheets), within the range of about 4 to 9 pounds for 480 sheets 24 x 36 inches. Both types of sheets are manufactured on a Yankee type machine and as manufactured they have a crepe ratio (i. e. the ratio of the length of the uncreped sheet to the length of the creped sheet) of about 2.0 to 3.0. The pad or bat product made from the asphalt containing sheets has a stable unit density (i. e., the density in which the product is self-supporting and may be used) as manufactured within the range of about 1.25 to 2 pounds per cubic foot. The pad or bat product made from the plain sheets, and depending somewhat upon the finish used, has a stable unit density as manufactured within the range of about 3 to 8 pounds per cubic foot. The superposed sheets are similarly arranged, i. e., the creping in all, or substantially all, of the superposed sheets extends in the same direction, preferably transversely to the length of the bat.

As has been previously stated, due to the extremely high bulk of these products the boxing, shipping, and handling costs have heretofore been excessively large and no means had been known whereby the density of products of this type could be temporarily increased to permit economical handling, shipping, storing, and use of the product without permanently impairing the ability of the product to be reformed into a product possessing characteristics even approximating the desirable characteristics of the original product. It is with the overcoming of these difficulties and with the improvement of the characteristics of the original product that the present invention is particularly concerned.

All of the original attempts to decrease temporarily the bulk of products of this type have resulted in complete failure. If an attempt is made to bale the article by any of the known ordinary methods of baling, the product after it has been baled seems to mat and becomes very difficult of restoration to anything even approaching its original condition of large bulk and low density. However, we have discovered that if a pad or bat of the type illustrated in Figure 1, and having physical properties as set forth in the foregoing, is compressed longitudinally, i. e. in a direction generally perpendicular to the direction of the creping in the individual sheets making up the bat, a relatively high density product will be produced which can be easily and conveniently restored at any time to its original condition without loss or impairment of any of the highly desirable properties of the original article. In fact, so far as the bulk of the restored product is concerned, the compression and subsequent restoration tend to produce greater bulk in the restored product than was possessed by the original pad or bat. It is desirable although not absolutely essential that the thickness and width of the bat be maintained substantially constant during the compressing operation.

The high density product produced by the practice of our invention can be conveniently packages or baled and can be conveniently handled; in use the restored length of the product is readily controllable by the user so that it will automatically accommodate itself to spaces of materially varying dimensions. A compressed pad is illustrated in Figure 3, that figure portraying to scale an article comprising the same number of sheets and originally having the same dimensions as the product shown in Figure 1. The product illustrated in Figure 3 is expansible from the compressed condition illustrated in that figure to a length substantially the same, or possibly even slightly greater, than the product illustrated in Figure 1, i. e., is expansible back to its original length or greater.

The amount that the original bat is compressed may be varied through rather wide limits depending upon the wishes of the operator and the purposes for which the product is to be used. However, a compression which does not reduce the length of the original pad or bat by at least one half is not advantageous, and a reduction in length to one-twentieth of the original length is usually about as much as can be conveniently accomplished by the use of ordinary machinery. In this connection, however, it must be noted that it is not possible to increase the density of the product made from plain sheets to more than about 75 pounds per cubic foot, which is the approximate weight of fully compressed, commercial cellulose fiber. Hence, it is not possible to utilize the full range of compression (½ to 1/20) for the products made from plain sheets having basis weights in excess of about 3.75 pounds per cubic foot.

The compressing operation is accompanied by certain physical changes in the product. The unit density increases in inverse ratio to the change in length of the original pad or bat, and the crepe ratio of the individual sheets is similarly increased. Thus for compressions which effect changes in length within the range of one-half to one-twentieth, the compressed pad or bat product when made from plain or non-asphalt bearing sheets will have a unit density within the range of from about 6 to a maximum of about 75 pounds per cubic foot. When made from asphalt bearing sheets of the type described in Fourness Patent 2,170,655, the compressed product will have a unit density within the range of about 2.5 to 40 pounds per cubic foot. In either case, however, the crepe ratio of the individual sheets making up the compressed product will be increased as an incident to the compressing operation within the range of about 4 to 60.

A press suitable for accomplishing the manufacture of the compressed product of the present invention is shown more or less diagrammatically in Figure 4. This press includes suitable top, bottom and side members 1, 2, and 3, respectively, for defining a rectangular chamber 4 of substantially the same dimensions as the bat which it is desired to compress. Necessarily these wall members must be capable of being swung open to permit the introduction of an uncompressed bat into the interior thereof. During operation of the press, a bat such as is indicated at 5 in Figure 1 is placed within the chamber 4 and is compressed perpendicularly to the direction of the creping therein by means of a suitable plunger or ram 6 movable within the chamber 4. This plunger 6 may be actuated by any suitable means, such as a hydraulic press or screw. The compressing of the bat 5 is accomplished merely by moving the plunger to the right from an initial position in the left-hand end of the chamber to the position in which it is illustrated in full lines in Figure 4, the resultant compressed bat, indicated at 7, being identical with the bat shown in Figure 3.

In one commercial embodiment, the original bats are eight feet, four inches in length, fifteen inches wide, and one inch thick, being made up of twenty-four separate plies or sheets of asphalt bearing, creped tissue. The original bats have a unit density of about 1.7 pounds per cubic foot. The constituent sheets contain, on a weight basis, about 83% cellulose, 12% asphalt, and 5% water, and they have a dryer or uncreped basis weight of 5.0 pounds for 480 sheets 24 x 36 inches and a crepe ratio as manufactured of 2.6. The superposed sheets are similarly arranged with the creping parallel to the fifteen inch direction. These bats may be readily compressed so as to reduce the eight foot, four inch dimension to about twenty inches thereby increasing the unit weight of the product from about 1.7 pounds per cubic foot to somewhat in excess of 8.5 pounds per cubic foot (a compression ratio of about 5). The crepe ratio of the constituent sheets is increased from its initial value of 2.6 to 13.0. The compressed bat, as illustrated at 7 in Fig. 4, is preferably tied in position when the plunger or ram 6 is in the full compressed position, or if desired, the bat 7 may be inserted directly into a suitable box or container in its compressed condition.

The resultant compressed product is of sufficient density to permit its being shipped economically, and it is very convenient to handle, store, and use. To restore this compressed or intermediate product to its original length, it is merely necessary to stretch or extend the product back to that original dimension as by grasping either end of the article and pulling it out in a direction opposite to the previous compression thereof. Upon extension of the product to its original length, it will be found to possess even more bulk than the original uncompressed bat, particularly if the compressing and extension operation is repeated several times. This increase in bulk is sometimes as great as one hundred per cent and seemingly results in part from the large increase in crepe ratio which is incident to the compressing operation. When the compressed bat is stretched the creping, being of much greater dimensions than in the uncompressed product, apparently tends to force the sheets further apart than was the case in the original uncompressed pad thereby increasing the bulk of the expanded product. The thermal and sound insulating characteristics of the product are fully preserved and in all respects the resultant article is as good, if not better, than it was prior to the compressing.

At this point it might be again stressed that it is only by compressing the article substantially perpendicular to the creping thereof and parallel to the plane of the component sheets that this ability of restoration is accomplished. If the width and thickness of the original pad or bat are maintained substantially unchanged throughout the compressing operation, it will be found that when the compressed article is stretched out its width is substantially the same as prior to the compressing operation.

A further desirable characteristic results during the use of the compressed article in that the amount of stretching during the restoration or expansion operation may be varied between fairly wide limits without any noticeable adverse effect on the desirable characteristics of the resultant product. This characteristic is very important in many instances as, for example, when the product is used as wall insulation for the spaces between the upright studs of the frame of a house (see Figures 7 and 8). In such installations the distance between the top and bottom studs varies in different buildings and sometimes in the same building, the usual limits being from seven feet six inches to nine feet, and heretofore it has been necessary for the contractor or workman to cut insulating bats to the various different lengths encountered on any particular job. By the present invention one standardized product which is very easy to handle will fit practically all buildings, and our invention thus makes possible a new method of insulating buildings.

In installing the compressed product of the present invention in such locations in accordance with the new method of our invention, the upper end of one of the compressed bats 7 is first fastened in place, as by a lath 9, the lath 9 being tacked through to the upper stud 11, as is shown particularly in Figure 8. Then the lower end of the bat is grasped in both hands by the carpenter, or other workman, and is extended or stretched to a sufficient length to fill the stud space. During the stretching operation the bat is fluffed a little by shaking to assure the attainment of the maximum bulk. The lower end is then tacked in place by a similar lath 12 and a few long nails such as are indicated at 13 are preferably driven in at intervals in order to aid in supporting the extended bat. It is apparent that the amount of extension of the product may be easily and conveniently regulated so as to fit the installation to spaces of rather widely varying dimensions. Moreover, this novel method of insulating the wall space of a building permits the satisfactory utilization of relatively thin insulation, principally because of the good support given the insulating material. Heretofore, to assure permanence of the insulation it has been common practice to substantially fill the wall space with the insulating material so as to prevent settling or displacement thereof. This practice was very wasteful of the insulating material because a relatively thin layer of insulation accomplishes almost as effective insulation as a much thicker layer.

If it is desired to market and sell the product in small lots, the unit compression method previously described would probably be used. However, for most commercial applications it is desirable to sell the product in bales consisting of a plurality of the separate compressed pads or bats 7 illustrated in Figure 3. We have found that bales of this type may be conveniently made in a single baling or compressing operation. A suitable apparatus for accomplishing this is illustrated rather diagrammatically in Figure 6; this apparatus, as will be seen by reference to that figure, includes suitable wall members 15, 16, and 17 for defining a rectangularly shaped chamber 18 wherein the compressing is accomplished, and a ram or plunger 19 of suitable dimensions which is movable within this chamber to accomplish the longitudinal compression of the product.

The mode of accomplishing the simultaneous compression of a plurality of pads or bats is substantially as follows: A plurality of the ordinary uncompressed bats of the type described in the above mentioned Biederman and Fourness patents, as indicated at 5 in Figure 1, are arranged in a pile, the creping in substantially all of the individual constituent sheets of the bats extending in the same direction, i. e., transversely to the length thereof. The several bats are preferably but not necessarily separated from each other by means of spacing sheets 20 which may conveniently comprise appropriately colored creped or plain tissue paper or thin waxed paper, or similar material. The sides of the box are rigid and serve to maintain the height of the pile of bats substantially uniform during the compression operation. The width of the bats will ordinarily change but little during the compression operation; and the use of a closure for the sides of the compression chamber is optional. The ram 19 is moved from the position shown in dotted lines in Figure 6 to the position shown in full lines in that figure, and the compressing of the entire pile of bats is thereby simultaneously accomplished. The degree of compression will, of course, vary in accordance with the requirements of the situation. When the ram 19 is in the fully compressed position, the several compressed bats which are now similar to the bat 7 of Figure 3, may be fastened together into a bale, such as is illustrated in Figure 5, by suitable straps or ties which are passed through suitable openings 21 in the ram and in the end of the baling apparatus. If desired, wooden headers 23 such as are illustrated in Figures 5 and 6 may be introduced into the baling apparatus prior to the compressing operation and cardboards 24 or the like may be placed on the top and bottom of the bale to aid in protecting the same. The ties for fastening the bale together may include straps 25 and wires 26.

It is sometimes desirable that some means be provided whereby all of the compressed bats 7 making up one of these bales may be simultaneously extended through a relatively simple operation. The apparatus and methods of the present invention lend themselves most effectively to the accomplishment of this. Particularly, during the baling operation a suitable adhesive, such as sodium silicate, is placed upon the inner surface of each of the wooden headers 23 immediately prior to the initiation of the compression and baling operation. This adhesive serves to securely affix the ends of each of the compressed bats 7 to the headers, and when the straps and wire 25 and 26 or other ties are released from the bale, it will be found that the headers 23 remain securely attached to the ends of the bats 7, as is shown in Figure 9. Upon the release of the baling straps the bats will generally expand to a slight extent.

With this arrangement, to stretch all of the bats to the desired length, it is necessary merely to fasten one of the headers and to then pull the other header away from the stationary header a sufficient distance to accomplish the desired increase in length of the compressed bats. During the extension of the bats some fluffing, which may be accomplished by shaking one or both of the headers, will be found to be very desirable. When the bats have been extended to the desired length the headers may be cut off by any convenient means. The arrangement and method lends itself to quantity production manufacturing methods and in actual practice has been found to operate most satisfactorily.

From the foregoing it will be seen that we have provided a novel type of multi-ply, cellulosic product, and method of manufacturing the same either as individual units or in multiple units such as bales. The product of our invention is capable of being stretched or otherwise extended a very considerable amount to adapt it for use as an insulating material, packing material, liquid absorbing material, or the like. When in the compressed state, this product has numerous advantages over any of the products heretofore known to the art in that it is a relatively dense article which may be shipped at reasonably low cost and which is easy to pack and to handle either as individual pads or in bales. Our invention fully overcomes the serious objections resulting from the extreme bulk and low density of the prior art products.

Probably the most important feature of the novel method of our invention resides in the discovery of the fact that low density, porous bats of the subject type may be converted, by compression applied longitudinally thereto, in a direction perpendicular to the creping in the individual sheets making up the bats into a relatively dense product of low bulk which possesses, at least potentially, all of the desirable qualities of such bats prior to the compression thereof. In fact, the compression and restoration particularly is carried out several times and actually increases the bulk and decreases the unit density of the restored product as compared with the bulk and unit density of the original pad or bat. In this connection, it should be mentioned that a reduction in length of the original bat of less than one-half is usually not advantageous, and a reduction in length to one-twentieth of the original length is usually as much as can be conveniently accomplished in ordinary machinery. Also it should be noted that it is very difficult, if not impossible, to practice the present invention unless the individual sheets making up the original uncompressed pad or bat have a crepe ratio of at least 1.25. The preferred crepe ratio range is about 2 to 3 and includes all normal crepe ratios obtained by ordinary manufacturing procedures.

We have also disclosed certain novel methods whereby compressed material may be prepared for use and installed in the structure with which it is to be used. The inherent ability of the material to accommodate itself to varying amounts of extension without impairment of the insulating or other desirable characteristics makes the product particularly suitable for being used according to these disclosed methods.

It will be apparent to those skilled in the art that various modifications of the above described article and methods of manufacturing and using the same may be employed. It is our desire, therefore, that the accompanying claims shall be accorded the broadest reasonable construction consistent with the state of the art.

We claim:

1. As an article of manufacture, a bale consisting of a plurality of superposed bats or pads each of which consists of a plurality of plies or layers of thin, creped, cellulosic tissue, a pair of header members each of which is disposed at one end of said bale, each of said superposed bats being longitudinally extensible in a direction substantially perpendicular to the direction of the creping therein to increase the length thereof and to decrease the unit density thereof within the range of from two to twenty times, each end of each of said bats being adhesively secured to one of said headers whereby all of said bats may be simultaneously lengthened by moving said headers away from each other, and means normally holding said headers in position at the ends of said bale.

2. The method of manufacturing a relatively dense, cellulosic product which may be extended or stretched to form a relatively low density product suitable for use as an insulating material, liquid absorbent material, packing material, or the like which comprises the steps of forming a relatively low density multi-ply pad or bat by superposing a plurality of sheets of thin, creped, cellulosic tissue in such manner that the creping in susbtantially all of said sheets extends in the same direction, and then materially compressing said pad or bat longitudinally in a direction generally perpendicular to the creping in said sheets.

3. The method of manufacturing a relatively dense cellulosic product which may be extended or stretched to increase the bulk and to decrease the density thereof so as to adapt the product for use as an insulating material, liquid absorbent material, packing material, or the like, which consists in the steps of forming a relatively low density, multi-ply pad or bat by superposing a plurality of sheets of transversely creped, thin, cellulosic tissue in such manner that the creping in substantially all of the sheets extends in the same direction, and then longitudinally compressing said pad or bat in a direction generally perpendicular to the creping in said sheets while maintaining the thickness of said pad or bat substantially without change.

4. The method of increasing the density of a pad or bat product which comprises a plurality of superposed sheets of thin, creped, cellulosic tissue which consists in longitudinally compressing the pad or bat in a direction substantially perpendicular to the creping therein while maintaining the height and width of the bat substantially constant.

5. The method of increasing the bulk of a pad or bat product which comprises a plurality of superposed sheets of thin, creped, cellulosic tissue, which comprises the steps of longitudinally compressing the pad or bat in a direction substantially perpendicular to the creping therein while maintaining the width of the bat substantially constant, and then restoring the bat to its original length, as by stretching.

6. The method of increasing the bulk of a pad or bat product which comprises a plurality of superposed sheets of thin, creped, cellulosic tissue which comprises the successive repetition of the steps of longitudinally compressing the pad or bat in a direction substantially perpendicular to the creping therein while maintaining the height of the bat substantially constant, and then restoring the pad or bat to its original length as by stretching, the alternate compression and stretching operations being repeated a sufficient number of times to accomplish the desired increase in bulk.

7. The method of simultaneously packaging or baling a plurality of articles, each of which consists of a low density, multi-ply bat formed from a plurality of superposed, gossamer-thin, creped, cellulosic sheets and adapted for use as an insulating material, liquid absorbent material, packing material, or the like, which consists in superposing a plurality of said bats with the creping thereof arranged in substantially parallel relation, placing a separating sheet between each of said bats, and then compressing the pile of superposed bats in a direction perpendicular to the creping in the component sheets thereof from two to twenty times, maintaining the height and width of said pile of superposed bats substantially constant during the compressing operation, and then tying said bats together to form a bale as by straps or the like at the conclusion of the compressing operation.

8. The method of simultaneously packaging or baling a plurality of articles, each of which consists of a low density bat formed from a plurality of superposed sheets or layers of thin, transversely creped, cellulosic tissue which consists in arranging a plurality of said bats into a pile, placing one of a pair of relatively rigid headers at either end of the pile, adhesively securing said headers at the ends of the bats making up said pile, and then materially decreasing the length of said pile by moving at least one of said headers toward the other, while at the same time maintaining the height and width of said pile substantially constant, and finally fastening said headers together by straps or the like in order to hold the resultant package or bale in the compressed condition, the adhesive fastening of the ends of said bats to said headers being of such strength that all of said bats may be simultaneously extended at any desired time by relative movement of one of said headers away from the other.

9. The method of simultaneously packaging or baling a plurality of articles, each of which consists of a low density bat formed from a plurality of superposed sheets or layers of thin, transversely creped, cellulosic tissue, which consists in arranging a plurality of said bats into a pile, placing one of a pair of relatively rigid headers at either end of the pile, adhesively securing said headers to the ends of the bats making up said pile, then decreasing the length of said pile in the neighborhood of from three to ten times by moving at least one of said headers toward the other while at the same time maintaining the height and width of said pile substantially constant, and finally fastening said headers together by straps or the like in order to hold the resultant package or bale in the compressed condition, the adhesive fastening of the ends of said bats to said headers being of such strength that all of said bats may be simultaneously extended at any desired time by relative movement of said headers.

10. The method of manufacturing a relatively dense, cellulosic product which may be extended or stretched to increase the bulk and to decrease the density thereof so as to adapt said product for use as an insulating material, liquid absorbent material, packing material, or the like, which consists in the steps of forming a relatively low density pad or bat by superposing a plurality of sheets of thin, creped, cellulosic tissue, and then reducing the length of said pad or bat generally perpendicularly to the creping in said superposed sheets, the reduction in length of said pad or bat being sufficient to increase the unit weight thereof within the range of from about two to twenty times.

11. The method of increasing the bulk of a pad or bat product constituting a plurality of superposed sheets of thin, creped, cellulosic tissue, which comprises the steps of longitudinally compressing the pad or bat in a direction generally perpendicular to the creping therein, and then restoring the pad to its original length as by stretching.

CHARLES A. FOURNESS.
JOHN B. CATLIN.